United States Patent
Frigon et al.

(10) Patent No.: US 10,374,292 B2
(45) Date of Patent: Aug. 6, 2019

(54) WIRELESS BACKHAUL NETWORK USING TRAVELING WAVE ANTENNAS

(71) Applicant: Everest Networks, Inc., Mountain View, CA (US)

(72) Inventors: Jean-Francois Frigon, Brossard (CA); Arbinder Singh Pabla, Fremont, CA (US); Michael Davies, Ottawa (CA)

(73) Assignee: Everest Networks, Inc., Mountain View, CA (US)

( * ) Notice: Subject to any disclaimer, the term of this patent is extended or adjusted under 35 U.S.C. 154(b) by 0 days.

(21) Appl. No.: 15/836,512

(22) Filed: Dec. 8, 2017

(65) Prior Publication Data

US 2018/0166770 A1 Jun. 14, 2018

Related U.S. Application Data

(60) Provisional application No. 62/432,271, filed on Dec. 9, 2016.

(51) Int. Cl.
*H04W 92/04* (2009.01)
*H04B 7/06* (2006.01)
(Continued)

(52) U.S. Cl.
CPC ........... *H01Q 1/246* (2013.01); *H01Q 1/2291* (2013.01); *H01Q 13/206* (2013.01);
(Continued)

(58) Field of Classification Search
CPC .... H01Q 1/246; H01Q 21/068; H04B 5/0018; H04B 7/0413; H04B 7/0617; H04W 88/06; H04W 92/045
See application file for complete search history.

(56) References Cited

U.S. PATENT DOCUMENTS

2011/0249576 A1* 10/2011 Chrisikos ............... H01Q 1/243
370/252
2013/0070742 A1* 3/2013 Picker ............... H04W 28/0247
370/338
(Continued)

OTHER PUBLICATIONS

Hashemi et al., "Dual-Mode Leaky-Wave Excitation in Symmetric Composite Right/Left-Handed Structure with Center Vias," IEEE MTT-S International Microwave Symposium, May 23-28, 2010, pp. 9-12.
(Continued)

*Primary Examiner* — David Bilodeau
(74) *Attorney, Agent, or Firm* — Fish & Richardson P.C.

(57) ABSTRACT

Disclosed are embodiments of a wireless access device for use in a wireless backhaul network. In an embodiment, a wireless access device for accessing a wireless network comprises: a first antenna module including a plurality of traveling wave antennas, wherein at least one of the traveling wave antennas has at least two ports; and an interface circuit coupled to the first antenna array, the interface circuit configurable to interconnect one or more radios to the one or more traveling wave antennas, including selectively interconnecting a radio frequency (RF) signal from a radio to a first port of at least one traveling wave antenna to generate a first beam for a first non-line-of-sight (NLOS) link of a wireless backhaul network, and selectively interconnecting a same or different RF signal from the same or another radio to a second port of the traveling wave antenna to generate a second beam for a second NLOS link of the wireless backhaul network, wherein the first and second beams have different radiation patterns or polarization.

22 Claims, 6 Drawing Sheets

(51) Int. Cl.
*H04B 5/00* (2006.01)
*H01Q 1/22* (2006.01)
*H01Q 1/24* (2006.01)
*H01Q 21/06* (2006.01)
*H04W 88/06* (2009.01)
*H01Q 13/20* (2006.01)
*H04B 7/0413* (2017.01)

(52) U.S. Cl.
CPC ......... *H01Q 21/068* (2013.01); *H04B 5/0018* (2013.01); *H04B 7/0617* (2013.01); *H04B 7/0691* (2013.01); *H04W 88/06* (2013.01); *H04B 7/0413* (2013.01); *H04W 92/045* (2013.01)

(56) References Cited

U.S. PATENT DOCUMENTS

2013/0070743 A1* 3/2013 Picker ............... H04W 28/0247 370/338
2013/0095774 A1* 4/2013 Gulati ..................... H04B 1/44 455/78
2014/0300520 A1* 10/2014 Nguyen ................ H01Q 13/28 343/739
2015/0110049 A1* 4/2015 Pabla ................... H04B 7/0697 370/329

OTHER PUBLICATIONS

Jackson et al., "Leaky-Wave Antennas," Proceedings of the IEEE, Jul. 2012, 100(7):2194-2206.
Liu et al., "Dominant Mode Leaky-Wave Antenna with Backfire-to-Endfire Scanning Capability," Electronics Letters, Nov. 7, 2002, 38(23):1414-1416.
Nguyen et al., "Performance-Enhanced and Symmetric Full-Space Scanning End-Switched CRLH LWA", IEEE Antennas and Wireless Propagation Letters, Jul. 14, 2011, 10:709-712.
Wang et al., "Beam-Switchable Scanning Leaky-Wave Antenna" Electronics Letters, Mar. 30, 2000, 36(7):596-597.

* cited by examiner

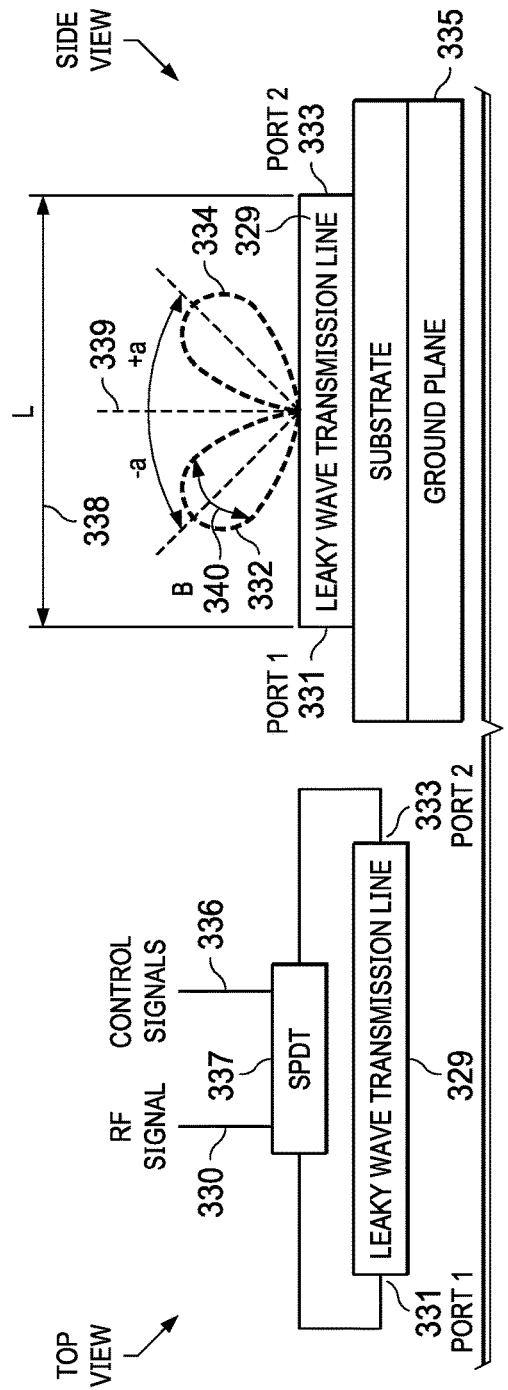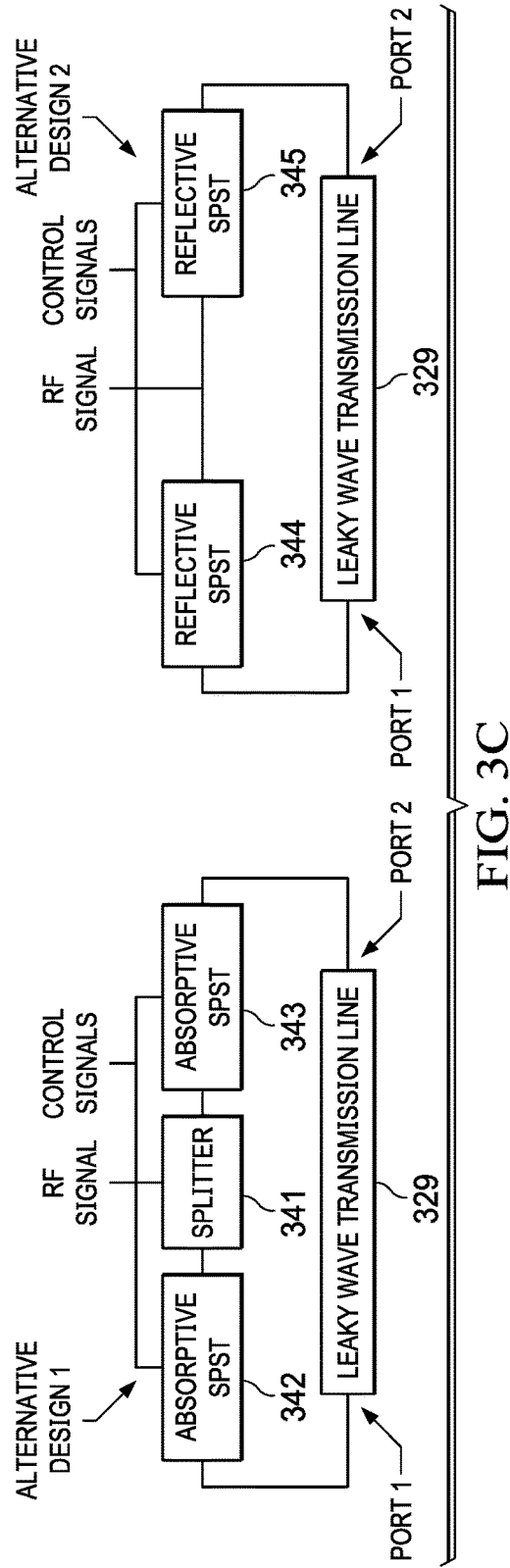
FIG. 3B
FIG. 3C

_US 10,374,292 B2_

WIRELESS BACKHAUL NETWORK USING TRAVELING WAVE ANTENNAS

CROSS-REFERENCE TO RELATED APPLICATION

This application claims priority to U.S. Provisional Patent Application No. 62/432,271, filed Dec. 9, 2016, the entire contents of which are incorporated herein by reference.

TECHNICAL FIELD

This disclosure relates generally to wireless communications.

BACKGROUND

The backhaul portion of a hierarchical telecommunications network includes intermediate links between a core network, or backbone network and the small subnetworks at the "edge" of the network. Traditionally the backhaul network is implemented using a high speed wired link (e.g., fiber optic cable) or line-of-sight (LOS) microwave links when it is too expensive to use high speed wired communications (e.g., remote base stations). Because of the prohibitive cost of connecting high speed wired links to each remote base station in a network it is desirable to use wireless transmission for backhaul links.

SUMMARY

Disclosed are embodiments of a wireless access device for use in a backhaul portion of a wireless network. In an embodiment, a wireless access device for accessing a wireless network comprises: a first antenna module including a plurality of traveling wave antennas, wherein at least one of the traveling wave antennas has at least two ports; and an interface circuit coupled to the first antenna array, the interface circuit configurable to interconnect one or more radios to the one or more traveling wave antennas, including selectively interconnecting a RF signal from a radio to a first port of at least one traveling wave antenna to generate a first beam for a first non-line-of-sight (NLOS) link of a wireless backhaul network, and selectively interconnecting a different RF signal from the same or another radio to a second port of the traveling wave antenna to generate a second beam for a second NLOS link of the wireless backhaul network, wherein the first and second beams have different radiation patterns or polarization.

Particular embodiments disclosed herein provide one or more of the following advantages. A wireless access device is disclosed for use with wireless backhaul networks that allows for real-time reconfiguration of antenna radiation patterns to adapt dynamically to current link characteristics, variable directivity of antenna beams and has a small, planar form factor for implementation in small cells.

The details of one or more implementations of the subject matter are set forth in the accompanying drawings and the description below. Other features, aspects and advantages of the subject matter will become apparent from the description, the drawings and the claims.

BRIEF DESCRIPTION OF THE DRAWINGS

FIG. 3B illustrates how a passive leakywave antenna (LWA) can be employed to provide sectorized switching according to an embodiment.

FIG. 3C illustrates two alternative configurable antennas according to an embodiment.

DETAILED DESCRIPTION

Figure 1:
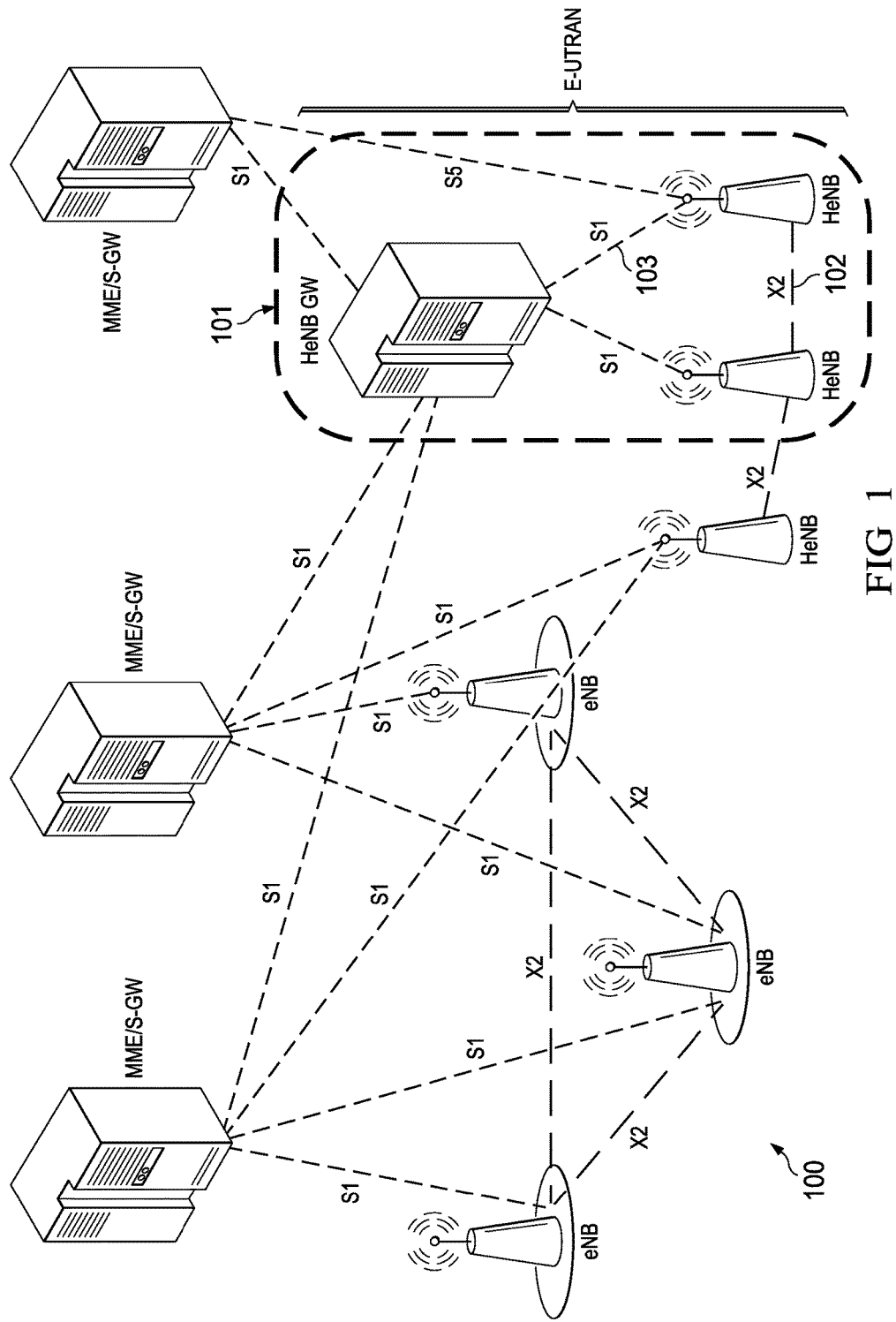
FIG. 1 illustrates a wireless network according to an embodiment.

FIG. 1 illustrates a wireless network according to an embodiment. Several networks (e.g., WiFi, LTE, WiMax) can be deployed in wireless network 100. In a typical deployment scenario, an access point or base station (e.g., pico cells, femto cells, small cells) communicate with each other and/or with a backbone gateway connected to wireless network 100 to exchange control information and/or user plane data. In the example shown, subnetwork 101 of small cells (HeNB) can operate as a separate entity. Backbone 102 provides links between small cells to exchange control information and/or user plane data for inter cell radio source management and data tunneling for mobility. Backbone 103 also links to the core network gateway (GW) for exchange of control information and/or user plane data with the core network.

Figure 2:
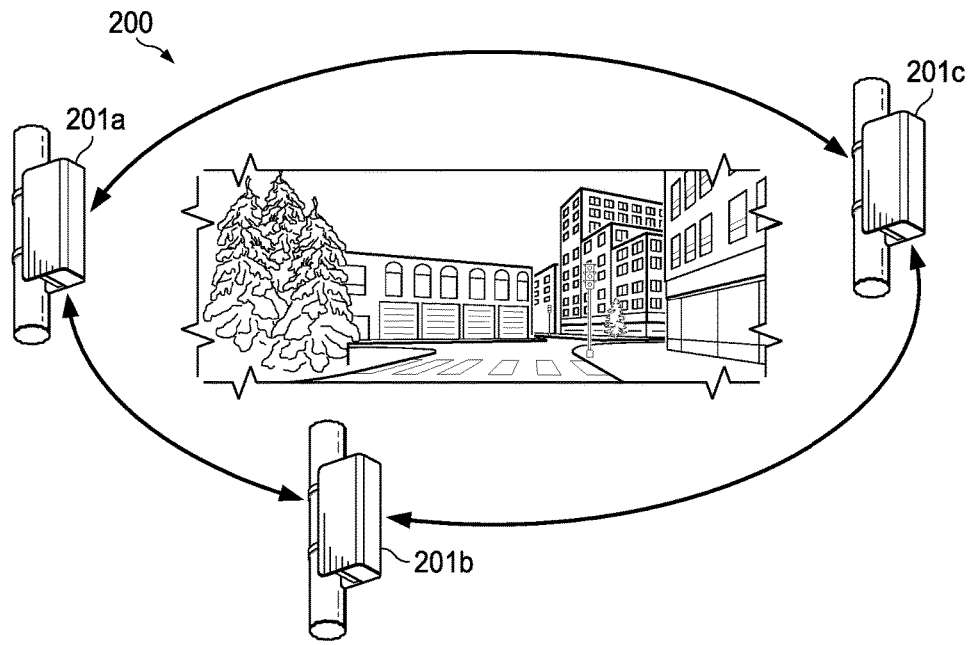
FIG. 2 illustrates a NLOS context according to an embodiment.

To accommodate increasing demand for high speed communications, large numbers of cells are expected to be deployed in urban environments. For example, as shown in FIG. 2, wireless access devices 201a-201c can be deployed on lamp posts, building walls or other structures. Because the prohibitive cost of connecting high speed wired links to each base station 201a-201c it is desirable to use wireless transmission for backhaul links. Unfortunately, wireless access devices 201a-201c are typically located at street level (e.g., not on a building's roof top) and in an urban environment there are reflectors (e.g., buildings, trees) that reflect and obstruct the wireless signals. Further, the wireless link characteristics vary over time due to the presence of moving objects that reflect the signals such as vehicles and people. The wireless backhaul links between the different wireless access devices 201a-210c and the gateway are thus time varying NLOS links. NLOS links are characterized by a large attenuation, the presence of multipath interference that creates frequency selective fading and unreliable link availability for high speed communications.

A key enabler for high speed wireless backhaul links are directive antennas. The antenna gain provided by directive antennas increases the received signal power and the antenna directivity decreases the signal delay spread and therefore mitigates the fading. This solution is appropriate for traditional LOS wireless backhaul communications. However, for a NLOS environment with small base stations the traditional approach is not viable for several reasons. First, the direction of the antennas is fixed which is not appropriate for a time varying NLOS environment in an urban setting. Also, the antennas are relatively large and cannot be implemented in a small cell. Finally, high directivity is not always the best choice in an urban environment, where multipath interference from different directions can be constructively combined at a radio frequency (RF) receiver to enhance the signal quality. The following characteristics would ideally be required from a directive antenna system for a NLOS wireless backhaul network: real-time reconfiguration of the antenna radiation pattern to adapt to the current link characteristics; variable directivity; and small form factor (preferably planar) for implementation in small cells. Conventional smart antenna technologies based on phased arrays or switched multi-beam systems do not have all these desired characteristics.

Figure 3A:
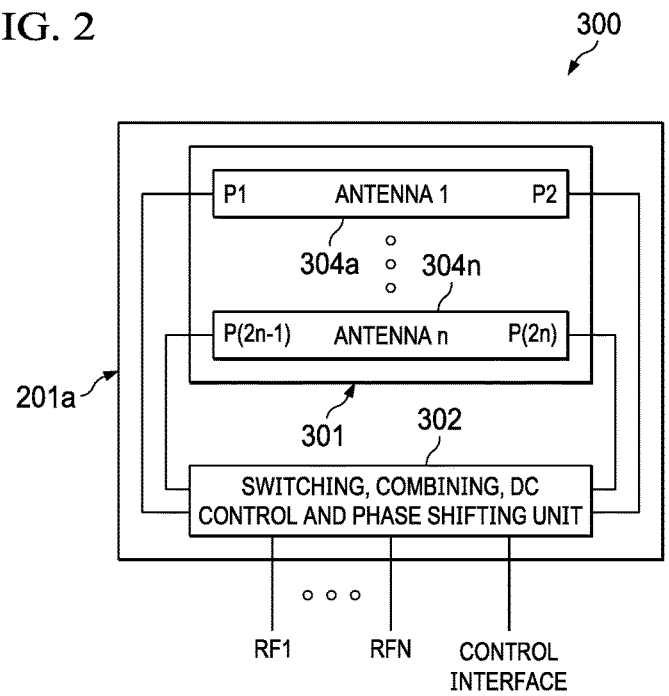
FIG. 3A illustrates an antenna module according to an embodiment.

FIG. 3A illustrates an antenna module according to an embodiment. Antenna module 301 includes antenna array 301 that includes antennas 304a-304n and interface circuit 302. In an embodiment, antennas 304a-304n are each a traveling wave antenna such as LWA. Each antenna 304a-304n has at least two input ports for receiving one or more RF signals (RF1-RFN), where different RF signals coupled to different ports will generate beams having different radiation patterns or polarization. In an embodiment, some of the antennas comprise electronic means, such as varactors, to adjust the radiation pattern of the antenna. In an embodiment, interface circuit 302 includes a direct current (DC) control and phase shifting unit and circuitry for switching and/or combing RF signals RF1-RFN, as described further in reference to FIGS. 3B and 3C.

Antenna module 300 provides high speed wireless NLOS backhaul links and offers all of the desired characteristics for a NLOS backhaul network that were described above in reference to FIG. 2. For example, the radiation pattern for a RF stream can be adjusted in real-time by dynamically combining and/or switching between RF ports and/or adjusting the DC bias voltage of varactors and/or adjusting the phase shift between antenna elements. A varactor provides an electrically controllable capacitance, which can be used in tuned circuits. It is small and inexpensive, which makes its use advantageous in small form factor devices.

The directivity of an antenna can be adjusted in real-time as follows. For example, an antenna can be configured to provide a broad, fan beam profile in elevation. And by combining multiple beams a narrower beam profile can be generated. The effective length of an antenna 304a-304n can be adjusted in real time by interface circuit 302. If LWAs are used in antenna module 300 then a desirable planar form factor can be provided for efficient integration in small cells. The height and width of antenna module 300 can be design parameters to allow flexibility for the designer to compromise between directivity, antenna integration and form factor.

In an embodiment, the interface circuit 302 is coupled to a radio bank and is configurable to interconnect a plurality of radios in the radio bank to the antennas 304a-304n, including selectively interconnecting at least one RF signal from one radio to a first port P1 of at least one of the plurality of antennas 304a-304n to generate a first beam with a first radiation pattern and selectively interconnecting one RF signal from the radio or another radio to a second port P2 of the at least one of the plurality of antennas 304a-304n to generate a second beam with a second radiation pattern. The first and second beams can have different radiation patterns or polarization. The first and second beam can be generated at different times or simultaneously.

Another advantage of using antenna module 300 in a wireless backhaul network is antenna module 300 can include multiple antennas integrated on common printed circuit board (PCB). The antennas can carry RF streams at the same frequency for spatial multiplexing (e.g., for multiple input multiple output (MIMO) communications) or spatial reuse with low co-channel interference, if the antennas are directed in different directions or spatial sectors. The antennas 304a-304n can also carry data at different frequencies and for different wireless technologies. In an embodiment, a first set of antennas integrated on a common PCB can be dedicated to a small cell for user communication one or more channels using, for example, LTE and/or WiFi technologies, and a second set of antennas can be dedicated to the backhaul network for exchanging control information and user plane data on one or more channels. Such an antenna configuration would allow provision of wireless network services in, for example, an LTE small cell and also provide links for the NLOS backhaul network. In urban environments, the NLOS backhaul network can reduce fixed and operating costs of a wireless service, thus allowing for a greater number of small cells and improved spectrum utilization.

FIG. 3B illustrates how a passive LWA can be employed to provide sectorized switching into two sectors (beams) using end-switching using a single pull double throw switch 337 state controlled by control signal 336. A particular embodiment of configurable antennas 307 is a passive LWA which is a class of travelling wave waveguide antenna that radiates at an angle that can be selected by design and fabrication. In an embodiment, the passive LWA is a symmetric microstrip waveguide that is a two port device. Because the antenna is symmetric the antenna can be signal coupled from either of the two end ports of the waveguide and will radiate at a specified angle. By coupling RF signal 330 into one port 331 of a passive LWA 329 the beam can be made to radiate at an angle −a 332 measured from antenna broadside 339 as described in FIG. 3B. The angle a can be either positive or negative depending on the passive LWA 329 design. By coupling the signal to the alternative port 333, the beam will radiate at an angle a 334 measured from antenna broadside 339. This two port switching provides two sectors defined by the arc width 340 of the radiated beam in each sector. The arc width 340 of the radiated beam in each sector is determined by the leaky wave transmission line 329 length 338. By design of the antenna, the radiation patterns 332 and 334 of the two sectors can be made to overlap or not overlap. In this manner two sectors can be combined to cover a full 180° or half-space. The LWA is microstrip antenna constructed on a ground plane 335 to prevent substantial radiation from backside lobes into the substrate of the device. A duality of LWA 329, back to back, but not necessarily conjoined back to back, can provide full 360° space coverage, with four sectors.

FIG. 3C shows two alternative embodiments of configurable antennas. The alternative embodiments use the same structure as described in FIG. 3B except that the single pull double throw switch 337 is replaced by a splitter/combiner 341 and two absorptive single pull single throw switches 342 and 343 for the alternative design 1 and two reflective single pull single throw switches 344 and 345 for the alternative design 2. By appropriately selecting the switches control signals 336, the RF signal 330 can either be coupled to port 1 331 to radiate at an angle −a 332, or coupled to port 3 333 to radiate at an angle a 334, or simultaneously coupled to port 1 331 and port 2 333 to simultaneously radiate at an angle −a 332 and at an angle a 334.

An alternative embodiment of 307 is the electronic leaky-wave antenna, in which steering of the beam with backfire-to-endfire capability can be established by electronically altering the properties of the travelling wave guide of the leaky wave antenna, and is described in Liu, L., C. Caloz, and T. Itoh, "Dominant mode leaky-wave antenna with backfire-to-endfire scanning capability," *Electronics Letters*, Vol. 38, 1414-1416, 2002.

Polarization diversity can be realized because the LWA can be excited by two modes, common and differential. If the LWA is excited in common-mode, then horizontal polarization is achieved, and if the LWA is excited in differential-mode, then vertical polarization is achieved. Thus, either horizontal or vertical polarization is achieved in one angular direction based on the LWA's frequency. If the RF frequency is changed, then the angular direction changes. For example, if the LWA is excited in common-mode in the LH region, then a backward beam is radiated with horizontal polarization, and if the LWA is excited in differential-mode in the RH region, then a forward beam is radiated with vertical polarization. Thus, a sector as defined by the arc of one beam, can be serviced with an alternate beam, at the same RF frequency, and if the mode isolation is sufficient this one sector can have two data streams at the same RF frequency that are sufficiently distinguishable for data communications applications.

A further embodiment of the antenna bank 304 is an array constructed from a multiplicity of passive leakywave antennas or electronic leakywave antennas or a combination of these configurable antennas that have an alternative, preferentially orthogonal, polarization. An example of a 4-port LWA capable of providing either vertical or horizontal polarization in one quadrant is described in M. R. Hashemi and T. Itoh, "Dual-Mode Leaky-Wave Excitation in Symmetric Composite Right/Left-Handed Structure with Center Vias". Microwave Symposium Digest (MTT), 2010 IEEE MTT-S International, vol., no., pp. 9, 12, 23-28 May 20101M52010.

It will be understood that a multiplicity of antennas 307, being LWA's in general, and either passive leakywave antennas or electronic leakywave antennas, can be fabricated as a plurality of configurable antennas as arrays on a common PCB, and or a multiplicity of the antenna arrays can be fabricated on a multiplicity of PCB and assembled or conjoined, to construct an antenna bank. For example, in an embodiment the physical elements 301, 302, 303, 305 can be internalized in the physical body or housing of universally flexible AP architecture 600, shown in FIG. 6, and antenna bank 604 can be internal to architecture 600 to achieve the maximum compactness of the AP while also providing the desired requisite spatial beam coverage.

Figure 4:
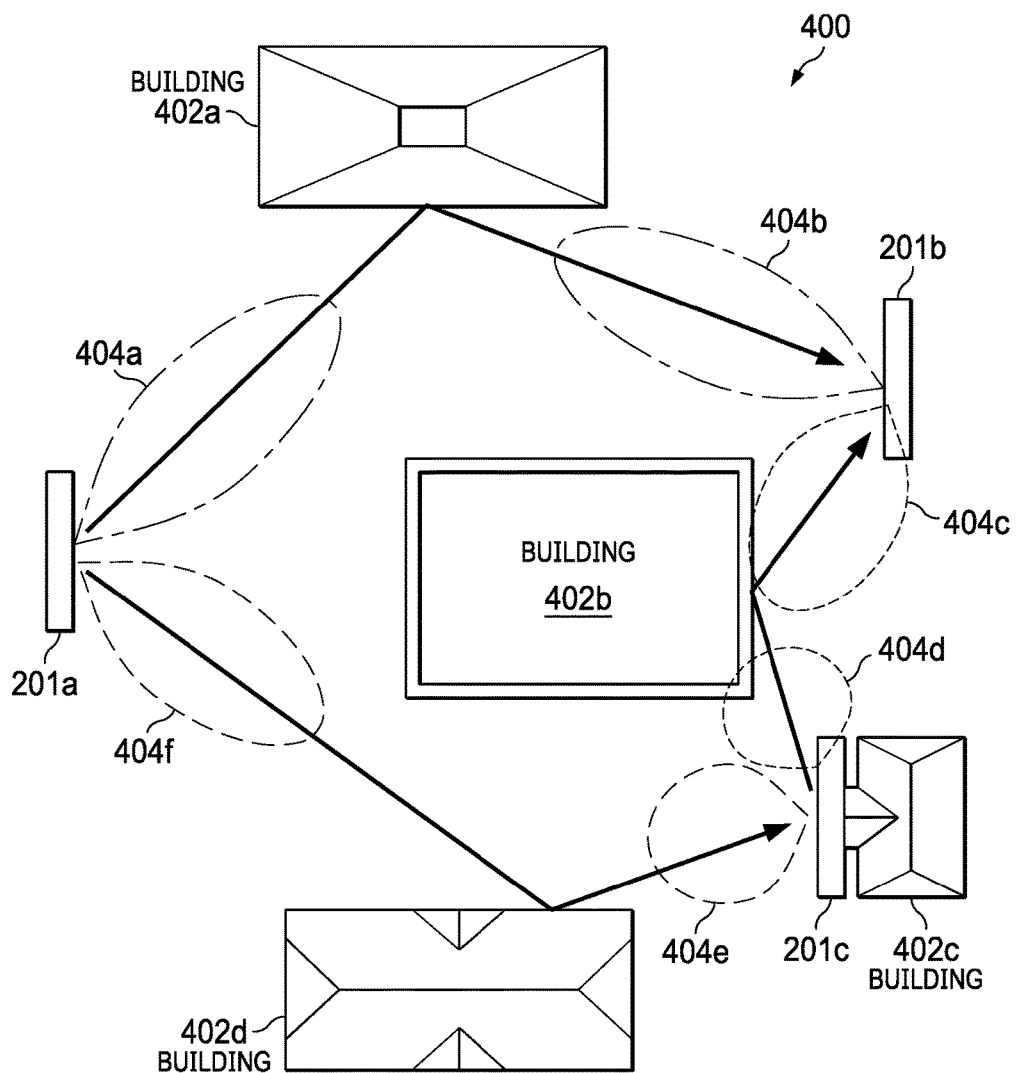
FIG. 4 illustrates a NLOS wireless backhaul concept with LWA according to an embodiment.

FIG. 4 shows an example of a NLOS wireless backhaul deployment using the antenna module of FIG. 3. Three wireless access devices 201*a*-201*c* are shown connected in a mesh network topology. Each access device uses two antennas to establish links (e.g., bi-directional links) with two other APs. In an embodiment, to establish a MIMO link between APs 201*a*-201*c*, more antennas can be integrated in the antenna module, and then directing a set of the antenna elements in the same direction. The direction of each of antenna radiation patterns 404*a*-404*f* can be configured in real-time to maximize link performance.

In a system with wideband channels, multipath interference rejection is often desirable to select a narrow cluster of multipath NLOS signals. This is due to the multipath NLOS signals with large delay spread (e.g., with different propagation delays) creating frequency selective fading in a wideband channel. Some of the spectrum, and in an orthogonal frequency-division multiplexing (OFDM) system some of the sub-carriers, suffer very large attenuation, thereby significantly reducing the link quality. Multipath NLOS signals within a cluster have similar propagation delays and therefore do not create significant frequency selective fading. By selecting the best cluster of multipath signals (e.g., the strongest reflectors), the link quality can be optimized. In a system with narrowband channels, frequency selective fading is not as big a problem. The antenna radiation pattern can be configured to combine selected clusters of multipath NLOS signals from different reflectors to constructively create the strongest NLOS signal. For both narrowband and wideband cases, the antenna gain provides a higher received signal power, and thus a more reliable link. Furthermore, for both wideband and narrow band channels, the radiation patterns can be dynamically adjusted due to the time-varying nature of the wireless channel in an urban environment.

The foregoing disclosure describes a single antenna module integrating several LWAs. In an embodiment, several of the antenna modules can be arranged to construct a small cell with scaled data throughput capacity. Due to its planar form factor, for any three-dimensional (3D) structure it is possible to integrate an antenna module on each face of the 3D structure. The arrangement possibilities are limitless and can be chosen to fit the required performance, available space and network topology. As an example, for a thin box form factor, two antenna modules can be placed back to back. An alternative example is a small cell having an octagon form factor where on each of the 8 sides, an antenna module is integrated. Note that each side does not need to be the same dimensions. For example, we can have a rectangle form, where two of the sides are narrower than the other. It is then possible to have a smaller antenna module with less directive antennas on two of the sides while the two other sides have longer more directive antennas.

Figure 5:
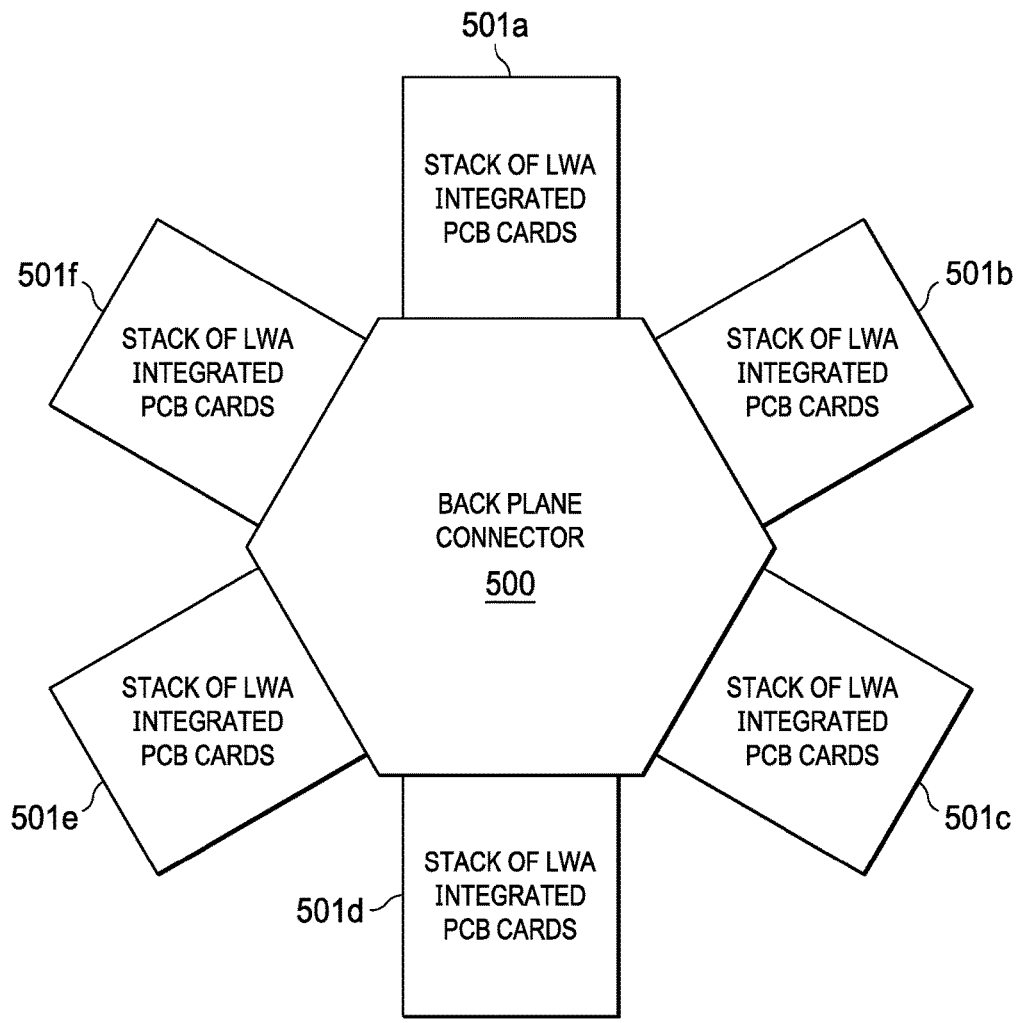
FIG. 5 illustrates a small cell star topology with LWA according to an embodiment

It is possible to use other arrangements described above with a middle connector such as the star topology shown in FIG. 5, which shows a hexagon backplane connector 500 coupled to stacks of integrated antenna PCB cards 501*a*-501*f*. Indeed, any number of conceivable topologies are possible, ranging from a one face flat panel to N panels arranged in a regular or irregular N faced polygonal structure. The backhaul network can be provided over different frequencies in licensed or unlicensed communications bands, or a combination of such frequencies (e.g., sub 6 GHz, 24 GHz, 60 GHz and 77 GHz or higher). The choice of backhaul frequency can be determined, for example, by factors such as spectrum availability, link range, environmental circumstances, placement of the small cell and system cost. The antennas in an antenna module can be arranged with single or cross polarization to enable either increased channel efficiency or enhanced diversity. The antenna modules can also be configured with different antenna gains and in differing combinations of antennas to provide different beam patterns and angles.

Further advantages of the disclosed NLOS backhaul system include using the proposed antenna modules in a variety of flexible network topologies in a network of small cells or cells with other wireless network elements. NLOS network topologies enabled with the antenna modules include one or more small cells or other network elements, a meshed network of small cells in a point-to-multipoint topology, such as a hub-and-spoke topology. The NLOS backhaul network capability enables rapid deployment of the network. Two or more NLOS-enabled small cells can be wirelessly linked. For example, a NLOS receiving module may be operating as a "master" and the other NLOS transmitting module located on the small cell requiring backhaul operating as a "slave," wherein the master adjusts its characteristics and directs the radiation characteristics of the slave cell to optimize the backhaul link. Such an arrangement could operate in, for example, a hub-and-spoke topological arrangement, with the hub cell providing aggregation of the data and control plane information of the spoke cells using the NLOS backhaul enabled in the hub and spoke cells. The central cell providing data aggregation itself can be provided with a high capacity wired backhaul or alternatively high capacity wireless link to the main network. In an embodiment, a mesh network of small cells with NLOS backhaul can be operated as a subnetwork of the main network.

Figure 6:
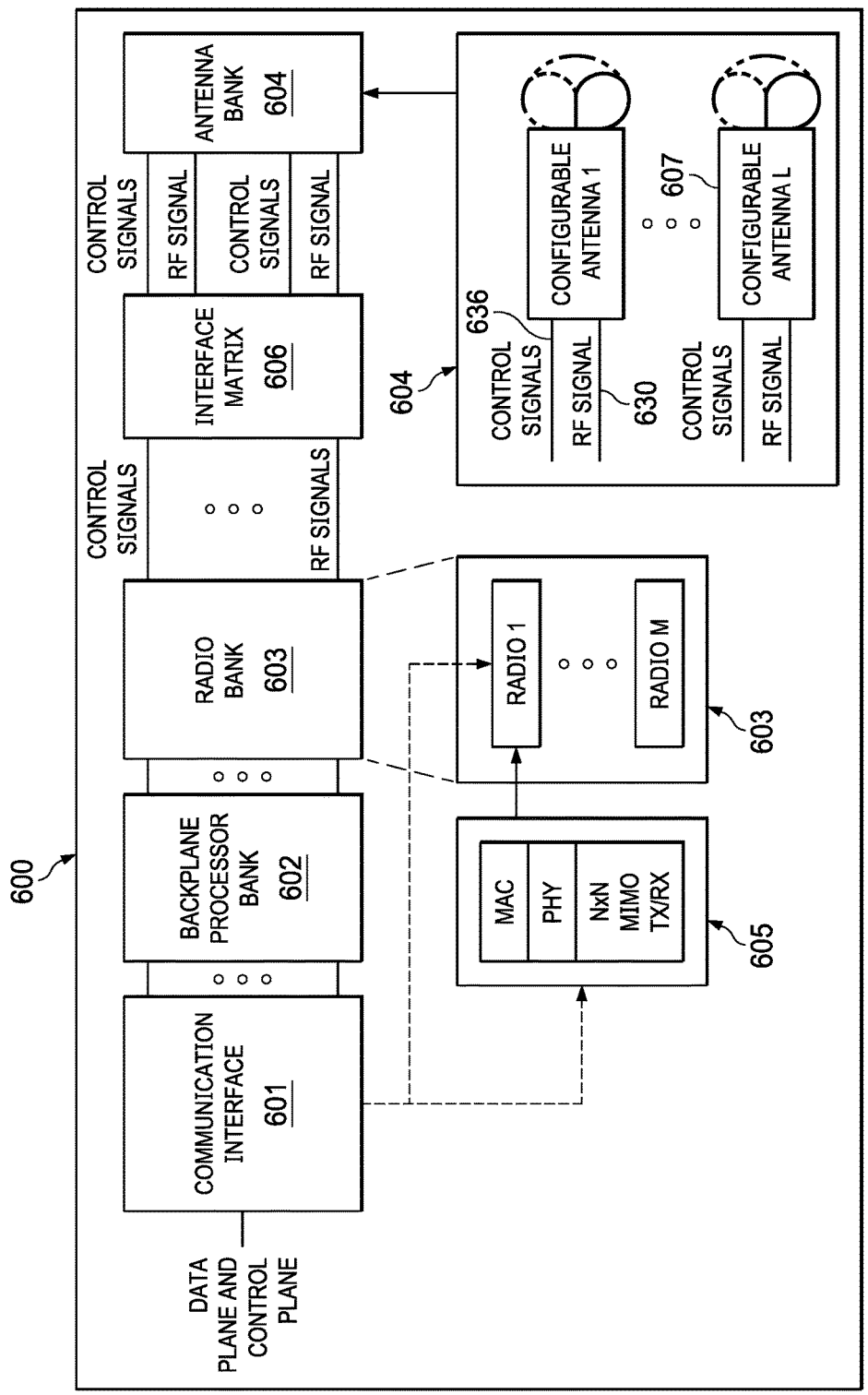
FIG. 6 is a block diagram of a universally flexible architecture for the wireless access device shown in FIGS. 3A-3C, according to an embodiment.

FIG. 6 is a block diagram of a universally flexible AP architecture 600 including the antenna modules described in FIGS. 3A-3B for NLOS backhaul networks. In an embodiment, the universally flexible AP architecture 600 includes: (1) a communication interface 601; (2) a multiplicity of processors in a backplane processor bank 602; (3) a radio bank 603 comprising a multiplicity of radios 605 that are preferentially MIMO radios which can be dynamically assigned to a multiplicity of independently configurable antennas 607; (4) an interface matrix 606 to dynamically interconnect the multiplicity of MIMO radios 605 in the radio bank 603 to the multiplicity of configurable antennas 607 in the antenna bank 604; and (5) an antenna bank 604 comprising a multiplicity of configurable antennas 607 which can be independently configured. The architecture 600 implements a method of dedicating and rededicating the assignment of specific radios 605 to specific configurable antennas 607 and configuring the configurable antennas 607 so assigned. It is a feature of the configurable antennas 607 that each antenna is independently configurable to emit directive RF into one spatial sector, and alternatively configured to radiate into a different spatial sector, or alternatively configured to radiate and the sector being defined by the beam pattern of said antenna.

The communication interface 601 provides the interface between the processors in the processor bank 602 and the backbone network. The communication interface is used to receive and transmit from the backbone network the control plane information to control and manage, via the processor bank 602, the universally flexible AP 600 and the data plane information to be transmitted to or received from the users connected to the universally flexible AP 600. A particular embodiment of the communication interface 601 is an Ethernet switch connected to an optical or twisted pair Ethernet physical interface. Another embodiment is an Ethernet switch connected to a DOCSIS cable modem. Another embodiment of the communication interface 601 is a Common Packet Radio Interface (CPRI).

The backplane processor bank 602 consists of a multiplicity of processors. The processors are used to implement the local or distributed functions for the management of the mandatory and optional functions of the radios, the local or distributed functions of the wireless network controller, and the local or distributed functions of a means of dedicating and rededicating the assignment of specific radios to specific antennas and configuring the antennas. The processors also implement the necessary communication protocols to interface with the other network elements in the wireless backbone network and wireless client devices.

The radio bank 603 consists of a multiplicity of radios 605. The various parameters of each radio in the radio bank, such as TX power, channel, bandwidth, SSIDs, security, etc., can be independently configured. Each radio comprises a multiplicity of transceivers, and optionally all or parts of the physical layer baseband signal processing, of the link layer functions and of the multiple access control layer functions. Each radio in the radio bank can also belong to different wireless technologies such as 802.11a/b/g/n/ac/ad, GSM, WCDMA, LTE, 802.16, 802.22, proprietary or standardized wireless backhaul technologies, etc. Each radio interfaces with a processor in the processor bank 602. More than one radio can interface with a processor. In some particular cases, the radio can interface directly with the communication interface 601. A particular embodiment of a radio that may be used in this architecture is a PCIe WiFi module card.

The interface matrix 606 includes circuitry that interconnects the RF ports from the multiplicity of radios 605 to the ports of the multiplicity of configurable antennas 607. The interconnections can be set up dynamically as a function of the control signals from the multiplicity of processors in the processor bank 602 and/or multiplicity of radios in the radio bank 603. The interface matrix can also interconnect some of the control signals to the control ports of the multiplicity of configurable antennas 607. The interface matrix 606 can enable the interconnections from all, part or a single RF ports of the radios 605 in the radio bank 603 to all, part or a single configurable antenna 607 ports. In an embodiment, the interface matrix 606 can enable the interconnection of any RF port of the multiplicity of radios 605 in the radio bank 603 to any port of the multiplicity of configurable antennas 607 in the antenna bank 604. In another embodiment, the interface matrix includes fixed interconnections between a RF port from a radio 605 and a port for a reconfigurable antenna 607.

The antenna bank 604 comprises a multiplicity of configurable antennas 607. Each configurable antenna 607 has a RF signal port and, optionally, a control signals port. Each configurable antenna 607 in the antenna bank 604 can be independently configured. Each configurable antenna can also have different characteristics such as operating band, radiation pattern beamwidth, antenna gain, number of radiation patterns, continuous or discrete beam steering, polarization type, fixed or switched orthogonal polarization, etc.

A particular embodiment is an antenna bank comprising a multiplicity of fixed directive antennas, or steerable directive antennas, or antennas for which the radiation pattern and/or the polarization can be reconfigured in real-time, or any combinations of those antennas. In this case, the universally flexible AP 600 architecture illustrated in FIG. 6 is a sectorized access point unit comprising a multiplicity of sectors determined by the independent configuration of the multiplicity of antennas 607. The coverage (beamwidth, main sector angle and transmit power) of the multiplicity of sectors can be changed dynamically by the method of dedicating and rededicating the assignment of specific radios to specific antennas and configuring the antennas. The multiplicity of sectors can overlap or not overlap. The multiplicity of radios can be dynamically assigned to a multiplicity of antennas, in one or more than one sector.

The use of travelling wave antennas of the form described in reference to FIGS. 3A-3C enables a compact planar array design with low power consumption for the antenna bank 604. A multiplicity of travelling wave analog antennas, such as employed in an array, can provide the requisite functionality of a directive beam from each antenna that can be configured to switch to an alternative beam. Any analog or digital beamforming antenna array with the characteristics of being composed of fixed directive, directive and steerable, directive and switchable to another radiative angle can provide a configurable antenna array suitable for the antenna bank 604. A preferred characteristic of the antenna bank is that it is composed of a multiplicity of low profile planar antenna arrays wherein each array comprises a multiplicity of fixed directive antennas, or steerable directive antennas, or antennas for which the radiation pattern and/or the polarization can be reconfigured in real-time, or any combinations of those antennas.

A particular embodiment of the configurable antenna 607 for use in the antenna bank 604, is travelling wave antennas, such as passive LWAs, electronic LWAs, end-switch passive LWAs, and end-switch electronic LWAs, the antennas being microstrip form. An example LWA that is directive, steerable and switchable, is described in publication: "Beam-switchable scanning leaky-wave antenna" Electronics Letters, 30 Mar. 2000, Vol. 36, no. 7, pg. 596-7 and "Performance-Enhanced and Symmetric Full-Space Scanning End-Switched CRLH LWA", *IEEE Antennas and Wireless Propagation Letters*, Vol. 10, 2011, p. 709-712, and described variously in D. R. Jackson, C. Caloz, and T. Itoh, "Leaky-wave antennas," *Proc. IEEE*, vol. 100, no. 7, pp. 2194-2206, July 2012.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims

What is claimed is:

1. A wireless access device for accessing a wireless network comprising:
    a first antenna module including a plurality of traveling wave antennas, wherein at least one of the traveling wave antennas has at least two ports; and
    an interface circuit coupled to the first antenna array, the interface circuit configurable to interconnect one or more radios to the one or more traveling wave antennas, including selectively interconnecting a radio frequency (RF) signal from a radio to a first port of at least one traveling wave antenna to generate a first beam for a first non-line-of-sight (NLOS) link of a wireless backhaul network, and selectively interconnecting a same or different RF signal from the same or another radio to a second port of the traveling wave antenna to generate a second beam for a second NLOS link of the wireless backhaul network, wherein the first and second beams have different radiation patterns or polarization.

2. The wireless access device of claim 1, where the first and second NLOS links of the wireless backhaul network are generated simultaneously.

3. The wireless access device of claim 1, further comprising:
    a second antenna module integrated with the first antenna module on a common printed circuit board, the second antenna module being dedicated for user communications on a wireless network coupled to the wireless backhaul network.

4. The wireless access device of claim 1, wherein the at least one traveling wave antenna is a planar, leaky wave antenna.

5. The wireless access device of claim 1, wherein the first or second beams are dynamically adjusted to maximize link performance by combining one or more selected clusters of NLOS signals from one or more different reflectors.

6. The wireless access device of claim 1, wherein the first and second antenna modules are arranged in a polygonal structure having N faces, where each antenna module is attached to a different face and N is a positive integer.

7. The wireless access device of claim 1, wherein the first and second antenna modules are included in a stack of one or more printed circuit board cards coupled to a backplane connector.

8. The wireless access device of claim 1, wherein the first and second antenna modules are configured with different antenna gains.

9. The wireless access device of claim 1, wherein the plurality of antennas is configured to have at least one of a single or cross polarization.

10. The wireless access device of claim 1, wherein the plurality of antennas includes at least two antennas that are configured to carry data channels at different frequencies using different technologies.

11. The wireless access device of claim 1, wherein the first antenna module includes at least two antennas that are configured to carry data channels at the same frequency for spatial multiplexing or spatial reuse with low co-channel interference.

12. A wireless backhaul network comprising:
    a first wireless access device coupled to a first structure, the first access device including: a first antenna module including a plurality of traveling wave antennas, wherein at least one of the traveling wave antennas has at least two ports; a first interface circuit coupled to the first antenna array, the first interface circuit configurable to interconnect one or more radios to the one or more traveling wave antennas, including selectively interconnecting a radio frequency (RF) signal from a radio to a first port of at least one traveling wave antenna to generate a first beam for a first non-line-of-sight (NLOS) link of the wireless backhaul network, and selectively interconnecting a different RF signal from the same or another radio to a second port of the traveling wave antenna to generate a second beam for a second NLOS link of the wireless backhaul network, wherein the first and second beams have different radiation patterns or polarization; and
    a second wireless access device coupled to a second structure, the second access device including: a first antenna module including a plurality of traveling wave antennas, wherein at least one of the traveling wave antennas has at least two ports and is independently configurable; an interface circuit coupled to the first antenna array, the interface circuit configurable to interconnect one or more radios to the one or more traveling wave antennas, including selectively interconnecting RF signal from a radio to a first port of at least one traveling wave antenna to generate a third beam for a third non-line-of-sight (NLOS) link of the wireless backhaul network, and selectively interconnecting a different RF signal from the same or another radio to a second port of the traveling wave antenna to generate a fourth beam for a fourth NLOS link of the wireless backhaul network, wherein the third and fourth beams have different radiation patterns or polarization.

13. The wireless access device of claim 12, where the first and second NLOS links of the wireless backhaul network are generated simultaneously.

14. The wireless backhaul network of claim 12, further comprising:
a second antenna module integrated with the first antenna module on a common printed circuit board, the second antenna module being dedicated for user communications on a wireless network coupled to the wireless backhaul network.

15. The wireless backhaul network of claim 12, wherein the at least one traveling wave antenna is a planar, leaky wave antenna.

16. The wireless backhaul network of claim 12, wherein at least one of the first, second, third or fourth beams are dynamically adjusted to maximize link performance by combining one or more selected clusters of NLOS signals from one or more different reflectors.

17. The wireless backhaul network of claim 12, wherein the first and second antenna modules are arranged in a polygonal structure having N faces, where each antenna module is attached to a different face and N is a positive integer.

18. The wireless backhaul network of claim 12, wherein the first and second antenna modules are included in a stack of one or more printed circuit board cards coupled to a backplane connector.

19. The wireless backhaul network of claim 12, wherein the first and second antenna modules are configured with different antenna gains.

20. The wireless backhaul network of claim 12, wherein the plurality of antennas is configured to have at least one of a single or cross polarization.

21. The wireless backhaul network of claim 12, wherein the plurality of antennas includes at least two antennas that are configured to carry data channels at different frequencies using different technologies.

22. The wireless backhaul network of claim 12, wherein the first antenna module includes at least two antennas that are configured to carry data channels at the same frequency for spatial multiplexing or spatial reuse with low co-channel interference.

* * * * *